(12) United States Patent
Akimoto et al.

(10) Patent No.: US 12,548,789 B2
(45) Date of Patent: Feb. 10, 2026

(54) COATING DEVICE

(71) Applicant: Panasonic Intellectual Property Management Co., Ltd., Osaka (JP)

(72) Inventors: Yudai Akimoto, Osaka (JP); Motoki Kinugawa, Kyoto (JP); Takanori Maruo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 797 days.

(21) Appl. No.: 17/797,623

(22) PCT Filed: Dec. 25, 2020

(86) PCT No.: PCT/JP2020/048902
§ 371 (c)(1),
(2) Date: Aug. 4, 2022

(87) PCT Pub. No.: WO2021/171778
PCT Pub. Date: Sep. 2, 2021

(65) Prior Publication Data
US 2023/0053506 A1   Feb. 23, 2023

(30) Foreign Application Priority Data
Feb. 27, 2020 (JP) ................. 2020-031521

(51) Int. Cl.
*B05C 5/02* (2006.01)
*B05C 13/02* (2006.01)
(Continued)

(52) U.S. Cl.
CPC ............ *H01M 8/10* (2013.01); *B05C 5/02* (2013.01); *B05C 13/02* (2013.01); *H01M 4/04* (2013.01)

(58) Field of Classification Search
CPC .......... H01M 8/10; H01M 4/04; B05C 1/0808; B05C 1/0526; B05C 13/00; B05C 13/02; B05C 5/02; B05C 5/0254
See application file for complete search history.

(56) References Cited

U.S. PATENT DOCUMENTS 4,707,384 A * 11/1987 Schachner ............ C23C 30/005
427/419.7
5,967,035 A   10/1999 Kustermann
(Continued)

FOREIGN PATENT DOCUMENTS

DE   29701547 U1   3/1997
JP   2004-233596 A   8/2004
(Continued)

OTHER PUBLICATIONS

Shackelford, James F. Alexander, William. (2001). CRC Materials Science and Engineering Handbook (3rd Edition)—5.30 Thermal Expansion of Ceramics. (pp. 449-482). Taylor & Francis. (Year: 2001).*

(Continued)

*Primary Examiner* — Dah-Wei D. Yuan
(74) *Attorney, Agent, or Firm* — Rimon P.C.

(57) ABSTRACT

A coating device includes a roll that conveys a material to be coated or onto which a coating material is applied, and a coater used to apply a coating material onto the material to be coated or onto the roll. At least a portion of the roll to be in contact with a material to be coated or at least a portion of the roll onto which a coating material is applied is formed of a low expansion material that has a linear expansion coefficient in the range from 0 [1/K] to $6.0\times10^{-6}$ [1/K] inclusive.

6 Claims, 3 Drawing Sheets

(51) Int. Cl.
    *H01M 4/04*         (2006.01)
    *H01M 8/10*         (2016.01)

(56) References Cited

U.S. PATENT DOCUMENTS

| | | |
|---|---|---|
| 6,202,557 B1 | 3/2001 | Kustermann |
| 2014/0338824 A1* | 11/2014 | Takagi ................ B29D 99/005 156/237 |
| 2018/0053946 A1* | 2/2018 | Ogasawara ........... H01M 4/881 |
| 2022/0204851 A1* | 6/2022 | Sawaya ..................... C08J 5/18 |

FOREIGN PATENT DOCUMENTS

| | | |
|---|---|---|
| JP | 2005-270878 A | 10/2005 |
| JP | 2009-057211 A | 3/2009 |
| JP | 2010-222090 A | 10/2010 |
| JP | 2015-191829 A | 11/2015 |
| JP | 2017-087186 A | 5/2017 |
| JP | 2017-100066 A | 6/2017 |
| JP | 2019-107606 A | 7/2019 |

OTHER PUBLICATIONS

Alumina, AZO Materials, https://web.archive.org/web/20170705203535/ https://www.azom.com/properties.aspx?ArticleID=52 (Year: 2017).*

Extended European Search Report issued in corresponding European Patent Application No. 20921859.3, dated Jul. 24, 2023.

International Search Report issued in corresponding International Application No. PCT/JP2020/048902, dated Mar. 23, 2021, with English translation.

\* cited by examiner

US 12,548,789 B2

COATING DEVICE

CROSS-REFERENCE TO RELATED APPLICATIONS

This application is the U.S. National Phase under 35 U.S.C. § 371 of International Patent Application No. PCT/JP2020/048902, filed on Dec. 25, 2020, which in turn claims the benefit of Japanese Patent Application No. 2020-031521 filed on Feb. 27, 2020, the entire content of each of which is incorporated herein by reference.

BACKGROUND

Field of the Invention

The present disclosure relates to a coating device.

Description of the Related Art

In recent years, with widespread use of electric vehicles (EV), hybrid vehicles (HV), and plug-in hybrid vehicles (PHV), for example, shipment of secondary batteries for automotive use has been increasing. In particular, lithium-ion secondary batteries are increasingly shipped. Secondary batteries are also becoming increasingly popular not only for automotive use, but also as power sources for mobile terminals such as notebook computers, for example. A general secondary battery mainly includes a positive plate, a negative plate, a separator, and an electrolyte as constituting elements. An electrode plate, such as a positive plate or negative plate, has a structure in which an electrode active material is laminated on a surface of a current collector made of metallic foil.

As a coating device used for manufacture of such electrode plates, Patent Literature 1 discloses a coating device that includes a backup roll for conveying a current collector as a material to be coated, and a coating die disposed such as to face the backup roll to discharge electrode slurry, prepared by mixing an electrode active material and a solvent, toward the material to be coated.

Patent Literature 1: Japanese Unexamined Patent Application Publication No. 2019-107606

As a result of intensive study regarding conventional coating devices, the inventors have found that, with regard to the conventional coating devices, there is room for improvement in enhancing the coating quality.

SUMMARY OF THE INVENTION

One embodiment of the present disclosure relates to a coating device. The device includes a roll that conveys a material to be coated or onto which a coating material is applied, and a coater used to apply a coating material onto the material to be coated or onto the roll. At least a portion of the roll to be in contact with the material to be coated or at least a portion of the roll onto which a coating material is applied is formed of a low expansion material that has a linear expansion coefficient in the range from 0 [1/K] to $6.0\times10^{-6}$ [1/K] inclusive.

Optional combinations of the aforementioned constituting elements, and implementation of the present disclosure in the form of methods, apparatuses, or systems may also be practiced as additional modes of the present disclosure.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
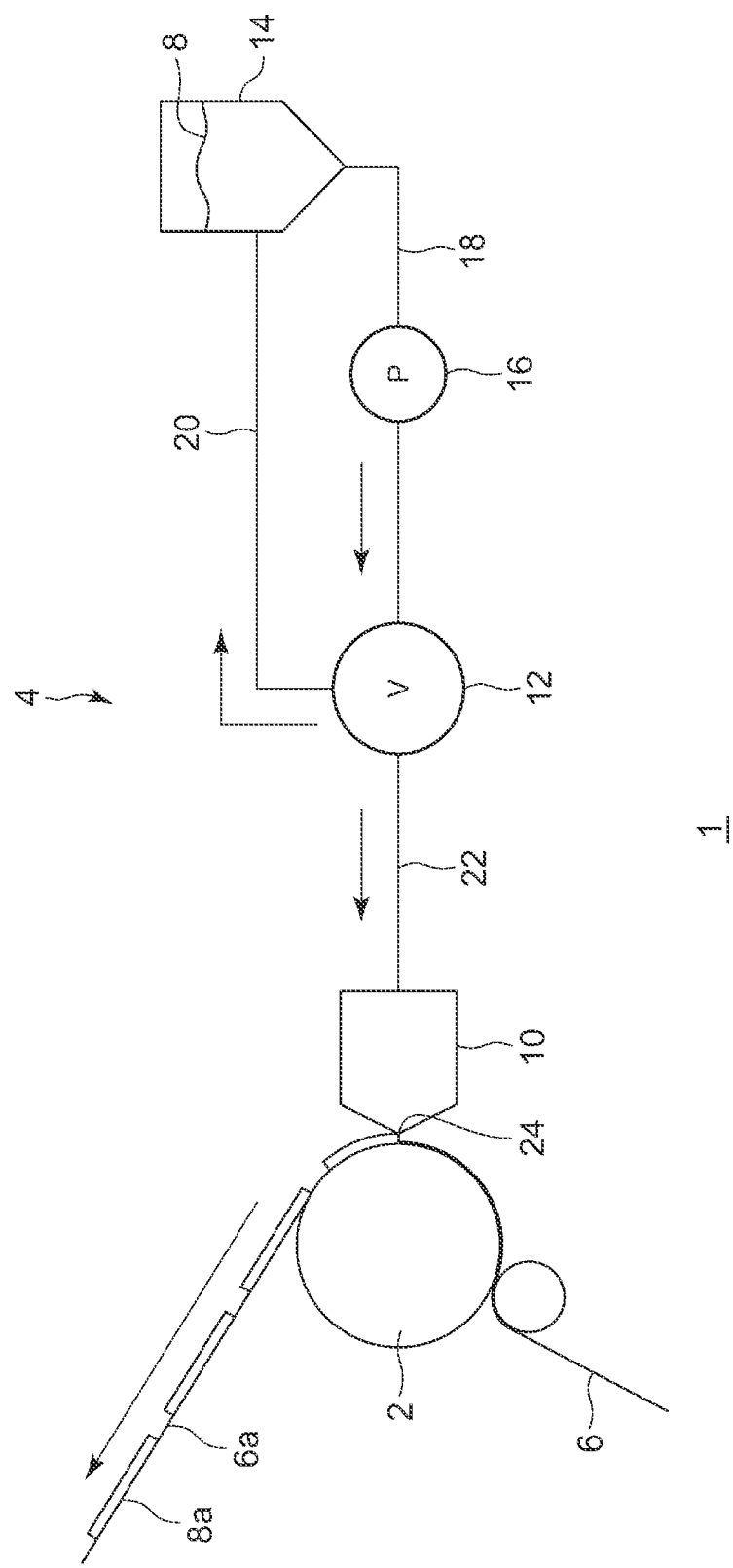
FIG. 1 is a schematic diagram of a coating device according to an embodiment.

In the following, the present disclosure will be described based on a preferred embodiment with reference to the drawings. The embodiment is intended to be illustrative only and not to limit the present disclosure, so that it should be understood that not all of the features or combinations thereof described in the embodiment are necessarily essential to the present disclosure. Like reference characters denote like or corresponding constituting elements, members, and processes in each drawing, and repetitive description will be omitted as appropriate.

Also, the scale or shape of each component shown in each drawing is defined for the sake of convenience to facilitate the explanation and is not to be regarded as limitative unless otherwise specified. When the terms "first", "second", and the like are used in the present specification or claims, such terms do not imply any order or degree of importance and are used to distinguish one configuration from another, unless otherwise specified. Further, in each drawing, part of members less important in describing the embodiment may be omitted.

FIG. 1 is a schematic diagram of a coating device according to the embodiment. A coating device 1 includes a roll 2 and a coater 4. The roll 2 in the present embodiment is a member that conveys a material 6 to be coated (web). More specifically, the roll 2 is a backup roll that continuously conveys the material 6 to be coated for the coater 4 while supporting the material 6 to be coated at the back surface. The coater 4 in the present embodiment is a mechanism for applying a coating material 8 onto the material 6 to be coated conveyed by the roll 2.

As an example, the coating device 1 of the present embodiment is used to manufacture electrode plates of secondary batteries. An electrode plate of a secondary battery is a sheet electrode material obtained by drying a current collector on which electrode slurry is applied. Accordingly, in the present embodiment, the material 6 to be coated is a current collector of a secondary battery, and the coating material 8 is electrode slurry of a secondary battery. The current collector may be metal foil, for example. The electrode slurry is an electron-conductive solid-liquid mixture that contains an electrode active material and a solvent. In the case of a general lithium-ion secondary battery, the positive electrode plate is prepared by applying electrode slurry containing a positive-electrode active material, such as lithium cobalt oxide and lithium iron phosphate, onto aluminum foil. Also, the negative electrode plate is prepared by applying electrode slurry containing a negative-electrode active material, such as graphite, onto copper foil.

The coater 4 includes a coating die 10, a valve 12, a tank 14, a pump 16, a feed pipe 18, a return pipe 20, and a die supply pipe 22.

The coating die 10 is a tool that discharges the coating material 8 onto the material 6 to be coated. The coating die 10 is disposed such that a discharge port 24 thereof faces a circumferential surface of the roll 2 with a certain space therebetween. The material 6 to be coated is continuously conveyed by means of rotation of the roll 2 to the position where the roll 2 and the discharge port 24 face each other.

To the coating die 10, the valve 12 is connected via the die supply pipe 22. With the valve 12, supply and non-supply of the coating material 8 to the coating die 10 can be switched. While the coating material 8 is supplied to the coating die 10, the coating device 1 can discharge the coating material 8 from the coating die 10 onto the material 6 to be coated. To the valve 12, the tank 14 is connected via the feed pipe 18 and the return pipe 20.

The tank 14 stores the coating material 8. On the feed pipe 18, the pump 16 is provided. With the pump 16 driven, the coating material 8 is fed from the tank 14 to the valve 12. The valve 12 supplies the coating material 8 from the tank 14 to the coating die 10 through the die supply pipe 22. Also, the valve 12 returns the coating material 8 from the tank 14 to the tank 14 through the return pipe 20.

The valve 12 supplies the coating material 8 to the coating die 10, which discharges the coating material 8, so that an applied part 8a of the coating material 8 can be formed on the material 6 to be coated. Also, the valve 12 returns the coating material 8 to the tank 14, and the application of the coating material 8 from the coating die 10 is stopped, so that an unapplied part 6a of the coating material 8 can be formed on the material 6 to be coated. In other words, the valve 12 enables intermittent coating of the coating material 8 onto the material 6 to be coated. The unapplied part 6a is used for pasting of the center lead of an electrode, for example. The configuration of each component of the coating device 1 is not limited to the configuration described above.

Figure 2:
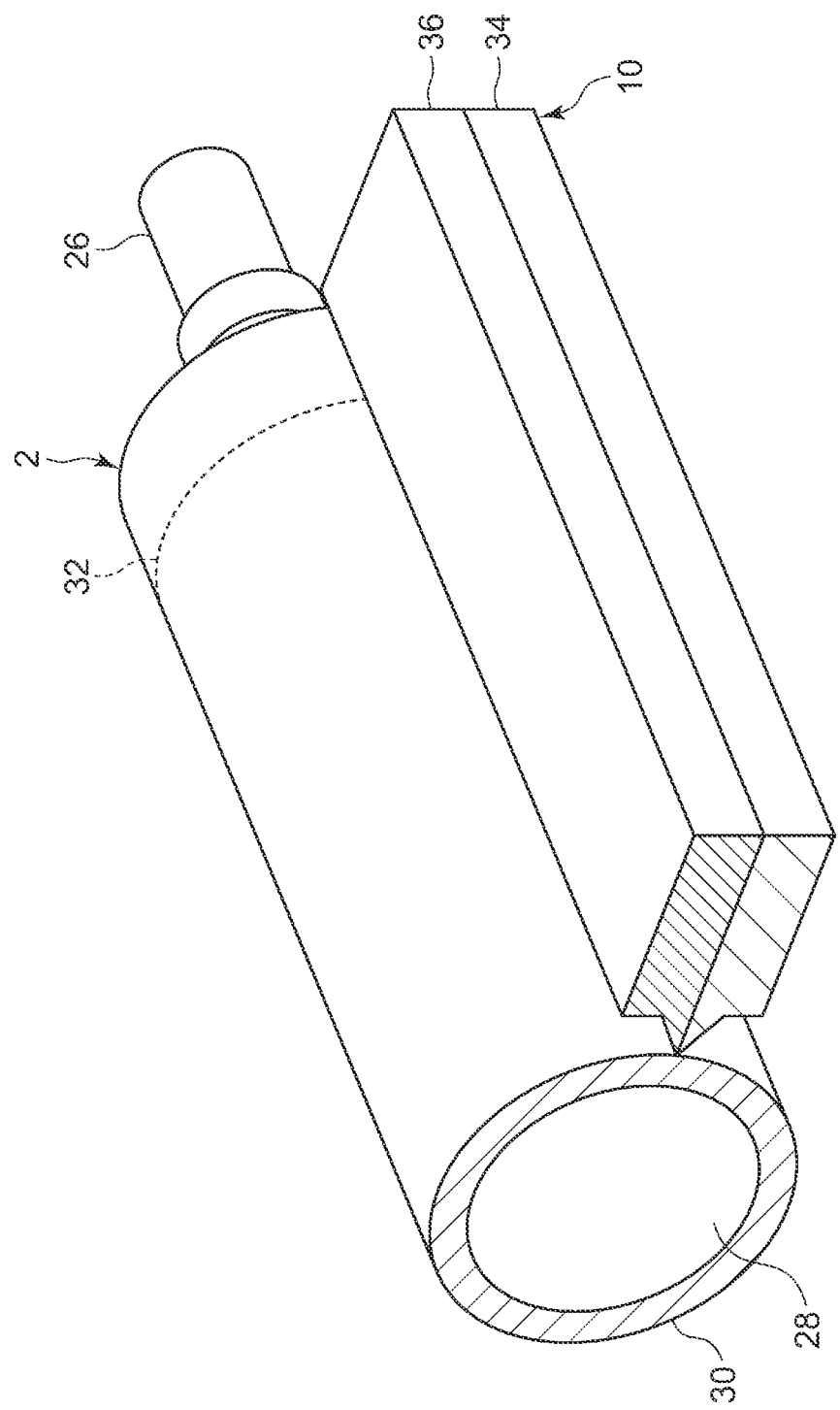
FIG. 2 is a perspective view of a roll and a coating die.

FIG. 2 is a perspective view of the roll 2 and the coating die 10. FIG. 2 illustrates half of both the roll 2 and the coating die 10 in a width direction. The other half, not illustrated, is symmetrical to the illustrated half. The roll 2 includes a rotating shaft 26 and a roll body 30. The rotating shaft 26 is connected at one end to a motor, not illustrated, to rotate. To the other end side of the rotating shaft 26, the roll body 30 is connected. The roll body 30 is a so-called hollow roll of circular tube shape and includes a hollow part 28 extending in a central axis direction of the tube (i.e., a width direction). With the rotation of the rotating shaft 26, the roll body 30 rotates in a direction around the rotating shaft 26. The diameter of the roll body 30 may be 50 mm or greater, for example. The roll body 30 includes, on its outer circumferential surface, a support region 32 where the material 6 to be coated is supported at the back surface.

The coating die 10 includes a first body 34 and a second body 36. Each of the first body 34 and the second body 36 is a member of elongated shape longer in a direction perpendicular to the conveyance direction of the material 6 to be coated, i.e., a direction in which the roll body 30 extends. The first body 34 and the second body 36 are arranged with a gap in between, and this gap forms the discharge port 24.

In the roll 2, at least a portion to be in contact with the material 6 to be coated, i.e., the support region 32, is formed of a low expansion material. Preferably, the entire roll body 30 may be formed of a low expansion material. The low expansion material has a linear expansion coefficient (coefficient of thermal expansion) in the range from 0 [1/K] to $6.0 \times 10^{-6}$ [1/K] inclusive.

When the coating material 8 is applied onto the material 6 to be coated, heat from the coating material 8 may be transferred to the roll 2 via the material 6 to be coated. In particular, when the material 6 to be coated is formed of a material with high thermal conductivity, the heat of the coating material 8 is easily transferred to the roll 2. When the heat is transferred to the roll 2, the roll 2 may be deformed due to expansion and contraction caused by the heat. In addition, as the temperature of the coating material 8 changes, the amount of heat transferred to the roll 2 also changes, so that the shape of the roll 2 becomes unstable. As a result, the material 6 to be coated is distorted, so that the formation of the applied part 8a with a uniform film thickness will be difficult.

The inventors have found that, in the coating device 1 used for electrode plate manufacture, if the amount of change in the coating gap caused by the temperature change of 1 degree C. of the coating material 8 can be made less than or equal to 5 μm, the applied part 8a with a film thickness uniform enough to respond to market requirements can be formed. The coating gap is a gap between the roll 2 and the coating die 10. The inventors have further found that, with a low expansion material having a linear expansion coefficient of $6.0 \times 10^{-6}$ [1/K] or less, the amount of change in the coating gap caused by the temperature change of 1 degree C. of the coating material 8 can be made less than or equal to 5 μm.

The above considerations should not be considered as a range of common general knowledge in the field of the present disclosure. Furthermore, even the feature of focusing attention on the parameter of the amount of change in the coating gap caused by the temperature change of 1 degree C. of the coating material 8 has been found by the inventors as a result of intensive study and corresponds to a technical idea that cannot be easily conceived by a person skilled in the art. Even when the coating device 1 is used for other purposes, not limited to electrode plate manufacture, it is desirable that the amount of change in the coating gap caused by the temperature change of 1 degree C. of the coating material 8 is made less than or equal to 5 μm.

The low expansion materials with linear expansion coefficients of $6.0 \times 10^{-6}$ [1/K] or less include certain low thermal expansion metals and certain low thermal expansion ceramics. The low thermal expansion metals include alloys, such as Invar (Fe, Ni 35 wt %, $1.2 \times 10^{-6}$ [1/K]), Super Invar (Fe, Ni 32 wt %, Co 4 wt %, $0.0 \times 10^{-6}$ [1/K]), Stainless Invar (Fe, Ni 52 wt %, Co 11 wt %, Cr, $0.0 \times 10^{-6}$ [1/K]), Fe—Pd alloy (Fe, Pd 31 wt %, $0.0 \times 10^{-6}$ [1/K]), alloy 42 (Fe, Ni, trace Cu, trace Mn, $4.5$-$6.5 \times 10^{-6}$ [1/K]), and Kovar (Fe, Ni, Co, $1.0 \times 10^{-6}$ [1/K]).

The low thermal expansion ceramics include cordierite ($2MgO \cdot 2Al_2O_3 \cdot 5SiO_2$, $0.1 \times 10^{-6}$ [1/K] or less), silicon nitride ($Si_3N_4$, $2.8 \times 10^{-6}$ [1/K]), silicon carbide (SiC, $3.7 \times 10^{-6}$ [1/K]), aluminum nitride (AlN, $4.6 \times 10^{-6}$ [1/K]), and mullite ($3Al_2O_3 \cdot 2SiO_2$, $5.0 \times 10^{-6}$ [1/K]).

When the wall thickness of the roll body 30 is d [mm], the outer diameter of the roll body 30 is D [mm], the length in a width direction of the roll body 30 is l [mm], the Young's modulus of the roll body 30 is E [kN/mm²], the load per mm width applied to the roll body 30 by its own weight is q [N/mm], and the ratio of a circle's circumference to its diameter is π, the roll body 30 preferably satisfies all of the following conditions:

(i) D>d
(ii) D≥50
(iii) d≥10
(iv) Maximum flexure $w = ql^4/(6\pi(D^4-(D-2d)^4)E) < 0.005$ Satisfying the conditions (i), (ii), and (iii) facilitates machining the roll body 30 with certain geometric tolerance. Also, by satisfying the condition (iv), the maximum flexure w can be kept less than or equal to 5 μm. This can restrain the distortion of the material 6 to be coated and facilitate the formation of the applied part 8*a* with a uniform film thickness.

Also, the roll 2 preferably includes, on the outer circumferential surface of the roll body 30, a coating that contains at least one material selected from a group including alumina, titanium oxide, chromium oxide, zirconia, magnesium oxide, diamond-like carbon, and glass materials containing silicon. The coating is a surface-treated layer (wear resistant layer) provided by applying, using a material as described above, surface treatment to the outer circumferential surface of the roll body 30. The surface treatment may be, for example, plating, thermal spraying, vapor deposition, lining, or welding. With the coating provided, wear of the roll body 30 caused by the material 6 to be coated or the coating material 8 can be restrained. As a result, changes in the dimensions of the roll body 30 can be restrained, so that the formation of the applied part 8*a* with a uniform film thickness can be facilitated.

Figure 3:
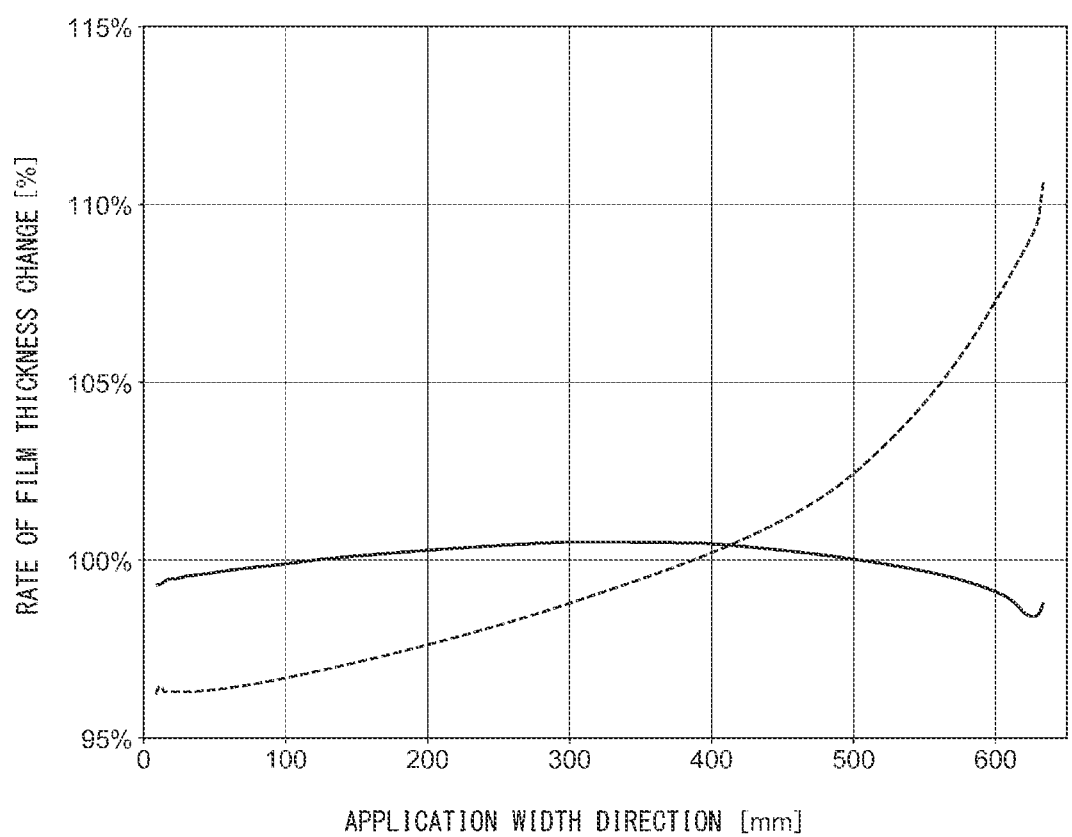
FIG. 3 is a diagram that shows a rate of film thickness change of an applied part formed by the coating device according to the embodiment, and a rate of film thickness change of an applied part formed by a coating device according to a reference example.

FIG. 3 is a diagram that shows a rate of film thickness change of an applied part formed by the coating device according to the embodiment, and a rate of film thickness change of an applied part formed by a coating device according to a reference example. In FIG. 3, the results of the embodiment are indicated by a solid line, and the results of the reference example are indicated by a dotted line. Also, the "application width direction" on the horizontal axis is a distance from the middle in a width direction of the applied part 8*a*, in other words, from the middle in a width direction of the discharge port 24. The application width direction of 0 mm means the middle in the width direction. Meanwhile, the "rate of film thickness change" on the vertical axis is a value (%) given by (actual film thickness/theoretical film thickness)×100, where the film thickness of the applied part 8*a* formed without any deformation of the roll 2 and the coating die 10 is defined as the theoretical film thickness.

In the coating device 1 of the embodiment, the roll 2 including the roll body 30 entirely formed of Invar with the linear expansion coefficient of $0.6 \times 10^{-6}$ [1/K] was used. Meanwhile, in the coating device of the reference example, the roll including the roll body entirely formed of stainless steel with the linear expansion coefficient of $10.8 \times 10^{-6}$ [1/K] was used. With a method described below, the film thickness of an applied part formed on a material to be coated using each of the coating devices was calculated. That is, the amount of deformation of the roll body and the coating die caused by heat transfer was calculated by numerical analysis by means of deformation analysis simulation using the finite element method. Also, the film thickness distribution of an applied part under the calculated deformation state of the roll body and the coating die was calculated by numerical analysis by means of fluid simulation using the finite volume method.

As shown in FIG. 3, the film thickness has changed by more than 10% in the case of the coating device according to the reference example, whereas, with the coating device 1 according to the present embodiment, the rate of film thickness change has been kept less than about 2%. Therefore, it was shown that, by employing the roll 2, which is at least partially formed of a low expansion material, the deformation of the roll 2 caused by heat can be restrained, so that the film thickness of the applied part 8*a* can be made more uniform.

At least part of the coating die 10 may preferably be formed of a low expansion material. For example, the first body 34 and the second body 36 may be entirely formed of a low expansion material. This can restrain the deformation of the coating die 10 caused by heat of the coating material 8. As a result, the discharge stability of the coating material 8 can be improved, so that the film thickness of the applied part 8*a* can be made more uniform.

Preferably, the coating device 1 is used under conditions where the difference between the ambient temperature of the coating device 1 and the temperature of the coating material 8 is within 1 degree C. This can restrain dimensional changes in the roll 2 caused by the difference between the ambient temperature and the temperature of the coating material 8. As a result, the formation of the applied part 8*a* with a uniform film thickness can be facilitated.

As described above, the coating device 1 according to the present embodiment includes the roll 2 that conveys the material 6 to be coated, and the coater 4 used to apply the coating material 8 onto the material 6 to be coated. At least a portion of the roll 2 to be in contact with the material 6 to be coated is formed of a low expansion material that has a linear expansion coefficient in the range from 0 [1/K] to $6.0 \times 10^{-6}$ [1/K] inclusive. This can prevent the situation where the roll 2 is deformed by heat from the coating material 8 or the external environment and the film thickness of the applied part 8*a* becomes non-uniform. Therefore, the coating quality of the coating device 1 can be improved.

Also, in the present embodiment, the material 6 to be coated is a current collector of a secondary battery, and the coating material 8 is electrode slurry of a secondary battery. This can improve the quality of the electrode plate. Also, the coater 4 includes the coating die 10 that discharges the coating material 8 to the material 6 to be coated, and at least part of the coating die 10 is preferably formed of a low expansion material. This can prevent the situation where the coating die 10 is deformed by heat from the coating material 8 or the external environment and the film thickness of the applied part 8*a* becomes non-uniform. Therefore, the coating quality of the coating device 1 can be further improved.

An embodiment of the present disclosure has been described in detail. The abovementioned embodiment merely describes specific examples for carrying out the present disclosure. The embodiment is not intended to limit the technical scope of the present disclosure, and various design modifications, including changes, addition, and deletion of constituting elements, may be made to the embodiment without departing from the scope of ideas of the present disclosure defined in the claims. Such an additional embodiment with a design modification added has the effect of each of the combined embodiment and modifications. In the aforementioned embodiment, matters to which design modifications may be made are emphasized with the expression of "of the present embodiment", "in the present embodiment", or the like. However, design modifications may also be made to matters without such expression. Optional combinations of the abovementioned constituting elements may also be employed as additional modes of the present disclosure. Also, the hatching provided on the cross sections in the drawings does not limit the materials of the objects with the hatching.

The use of the coating device 1 is not limited to electrode plate manufacture. The type of the coater 4 is not limited to the die type and may be the gravure type or the reverse type, for example. The roll 2 is not limited to a backup roll and may be any other roll that conveys the material 6 to be coated. The roll 2 may also be a roll onto which the coating material 8 is applied, such as an applicator roll. Therefore, the coating device 1 may include the roll 2 onto which the coating material 8 is applied and the coater 4 used to apply the coating material 8 onto the roll 2, and at least a portion of the roll 2 onto which the coating material 8 is applied may be formed of a low expansion material that has a linear expansion coefficient in the range from 0 [1/K] to $6.0 \times 10^{-6}$ [1/K] inclusive. In this case, the coating material 8 applied onto the roll 2 is transferred to the material 6 to be coated.

The invention claimed is:

1. A coating device, comprising:
    a roll configured to convey a material to be coated or onto which a coating material is applied; and
    a coater used to apply a coating material onto the material to be coated or onto the roll,
    wherein at least a portion of the roll to be in contact with the material to be coated or at least a portion of the roll onto which a coating material is applied is formed of a low expansion material that has a linear expansion coefficient in a range from 0 [1/K] to $6.0 \times 10^{-6}$ [1/K] inclusive,
    wherein the roll includes a roll body of circular tube shape,
    wherein, when a wall thickness of the roll body is d [mm], an outer diameter of the roll body is D [mm], a length in a width direction of the roll body is l [mm], the Young's modulus of the roll body is E [kN/mm²], a load per mm width applied to the roll body by its own weight is q [N/mm], and a ratio of a circle's circumference to its diameter is π, the roll body satisfies all of the conditions of
    (i) D>d,
    (ii) D≥50,
    (iii) d≥10, and
    (iv) maximum flexure $w = ql^4/(6\pi(D^4-(D-2d)^4)E) < 0.005$, and
    wherein the low expansion material is formed of at least one low thermal expansion metal selected from a group consisting of Invar, Super Invar, Stainless Invar, Fe—Pd alloy, alloy 42, and Kovar.

2. The coating device according to claim 1, wherein the material to be coated is a current collector of a secondary battery, and the coating material is electrode slurry of a secondary battery.

3. The coating device according to claim 1, wherein
    the coater comprises a coating die configured to discharge that discharges the coating material to the material to be coated or to the roll, and
    at least part of the coating die is formed of the low expansion material.

4. The coating device according to claim 1, wherein the roll includes, on an outer circumferential surface thereof, a coating that contains at least one material selected from a group including alumina, titanium oxide, chromium oxide, zirconia, magnesium oxide, diamond-like carbon, and glass materials containing silicon.

5. The coating device according to claim 1, used under conditions where a difference between an ambient temperature of the coating device and a temperature of the coating material is within 1 degree C.

6. The coating device according to claim 1, wherein the linear expansion coefficient of the low expansion material is in a range from 0 [1/K] to $2.8 \times 10^{-6}$ [1/K] inclusive.

* * * * *